United States Patent [19] [11] 4,246,162
Schreiber [45] Jan. 20, 1981

[54] EPOXY RESIN MOULDING COMPOSITIONS

[75] Inventor: Bruno Schreiber, Aesch, Switzerland

[73] Assignee: Ciba-Geigy Corporation, Ardsley, N.Y.

[21] Appl. No.: 86,007

[22] Filed: Oct. 17, 1979

[30] Foreign Application Priority Data

Oct. 30, 1978 [CH] Switzerland ............... 11174/78

[51] Int. Cl.³ ............... C08G 59/28; C08G 59/62
[52] U.S. Cl. ............... 260/37 EP; 260/38; 525/109; 525/481; 525/486; 525/489; 525/523; 525/934; 528/98; 528/104
[58] Field of Search ............... 525/109, 481, 486, 489, 525/523, 934; 528/98, 104; 260/37 EP

[56] References Cited

U.S. PATENT DOCUMENTS

| | | | |
|---|---|---|---|
| 3,028,251 | 4/1962 | Nagel | 117/21 |
| 3,496,130 | 2/1970 | Wasem et al. | 260/26 |
| 3,538,184 | 3/1970 | Meer | 260/830 |
| 3,694,407 | 9/1972 | Krikorian | 260/47 EP |
| 4,129,556 | 12/1978 | Zondler et al. | 528/97 |

*Primary Examiner*—Earl A. Nielsen
*Attorney, Agent, or Firm*—Harry Falber

[57] ABSTRACT

A moulding composition consisting of an epoxy resin adduct of a low molecular diglycidyl ether of bisphenols and an aromatic diamine together with a filler, an accelerator, and an aromatic polyol as hardener. Mouldings having excellent resistance to cracking can be obtained from this moulding composition.

13 Claims, No Drawings

EPOXY RESIN MOULDING COMPOSITIONS

The present invention relates to epoxy resin moulding compositions which contain an epoxy resin adduct, an accelerator, a filler and, as hardener, an aromatic polyol.

Because of their advantageous properties, epoxy resin moulding compositions have recently acquired a wide diversity of uses in the art. For economic and production reasons, there is often a desire for solid, flowable and storable epoxy resin compositions. A particular suitability for specific end uses arises from the choice of basic constituents, namely resin and hardener. Further modifications are often made by the addition of aggregates, whereby an improvement in the mechanical, electrical and also processing properties is achieved.

It is of considerable importance for the production of moulded articles from epoxy resin moulding compositions that they should posses excellent ejection hardness, in order to avoid as far as possible an uneconomic amount of time being spent on cooling the mouldings or on forming them.

If the mouldings are subjected to temperature for a prolonged period of time, it is also necessary that they have excellent resistance to continuous heat so that the mechanical properties are substantially retained during the period of use.

Epoxy resin moulding compositions have acquired particular importance in the electrical engineering industry, as they generally meet the requirements made of them. The resistance to cracking of mouldings made from epoxy resin moulding compositions containing reinforcing fillers, especially of encased heavy metal components, is still regarded as insufficient. Good resistance to cracking is a prerequisite for permanent protection of the casing. Cracking can occur during or after removal, cooling, storage or use of the mouldings.

The present invention has for its object the provision of a solid, storable, quick-curing epoxy resin moulding composition which can be easily processed and from which mouldings have excellent resistance to cracking and continuous heat and good ejection hardness can be obtained.

The epoxy resin moulding composition of the present invention consists of (a) a solid epoxy resin which is an adduct of a low molecular diglycidyl ether of bisphenols and an aromatic diamine and which has a melting point of at least 50° C. and contains at least 2.0 epoxy equivalents per kg of resin, (b) a hardener, (c) at least one accelerator, and (d) at least one filler, said epoxy resin composition containing, as hardener (b), at least one aromatic polyol containing more than 5 phenolic hydroxyl equivalents per kg of polyol and having a melting point of at least 50° C., and in an amount such that the content of phenolic hydroxyl groups per epoxy group is 0.5 to 1.5.

The aromatic polyol employed as hardener (b) is preferably a polyol which is derived from an aromatic hydrocarbon, in particular one which is derived from phenol.

A particular preferred group of hardeners comprises the reaction products of phenols with aldehydes obtained in an acid reaction medium and known as novolaks. In addition to phenol itself, suitable phenols are e.g. cresols, xylenols and resorcinol, which are used singly or in admixture. Formaldehyde is used chiefly as aldehyde in addition to acetaldehyde.

Another group of polyol hardeners consists of monomer or polymer hydroxyphenylated hydrocarbons, the hydrocarbon radical of which can contain e.g. 2 to 10, in particular 2 to 4, carbon atoms. Examples are: 1,1,2,2-tetraphenylolethane, 1,1,3-triphenylolpropane and poly-p-vinylphenol.

In many cases it is advantageous to mix the novolaks employed as hardener with other aromatic or also aliphatic polyols, for example with diols such as bisphenol A, resorcinol etc., and to use these mixtures as hardeners.

The epoxy resins (a), which preferably have a melting point of at least 60° C. and an epoxy group content of at least 2.5 equivalent/kg of resin, are known adducts which are described e.g. in U.S. Pat. Nos. 3,409,591, 3,454,421, 3,533,985, 3,963,666 and 3,996,175. The starting materials for their production are low molecular, liquid to semi-liquid diglycidyl ethers of bisphenols, especially of bisphenol A, which preferably contain more than 4.5 epoxy group equivalents/kg. By means of a chain lengthening with an aromatic diamine, these diglycidyl ethers are converted into a solid, but still reactive form. Suitable diamines are described in the patent specifications referred to above. Examples are: diaminophenylalkanes or -alkylidenes, diaminodiphenyl ethers thioethers or diaminodiphenylsulfones, such as 4,4'-diaminodiphenylmethane, 2,2-bis(4'-aminophenyl)-propylidene, b 4,4'-diaminodiphenyl ether, 4,4'-diaminodiphenyl thioether, 4,4'-diaminodiphenylsulfone, 4,4'-diamino-3,3'-dichlorodiphenylmethane, m-, o- or p-phenyldiamine, toluidine, phenyl-substituted alkylenediamines, for example 1,2-diamino-1,2-diphenylethane.

For modificiation and for obtaining desired properties, it is possible to replace up to 50% of the epoxy resin (a) by one or more epoxy resins which are solid at room temperature. Examples of such epoxy resins are: glycidyl ethers of novolaks and bisphenols, N-glycidyl compounds, such as triglycidylisocyanurate and glycidylhydantoins, polyglycidyl esters and halogen-containing epoxy resins, e.g. based on tetrabromobisphenol A.

The accelerators (c) are ordinarily employed in amounts of 0.1 to 5, preferably 0.1 to 2, percent by weight, based on the moulding composition. Suitable compounds are those which are able to promote the reaction. Examples are: imidazole and its homologues and also salts thereof with polycarboxylic acids or anhydrides thereof, such as imidazole, 1-methylimidazole, 2-ethylimidazole, 2-methyl-4-ethylimidazole, 2-phenylimidazole, benztriazole, organophosphorus compounds, $BF_3$ or $BCl_3$ complexes, organic phosphonium borates, alkylammonium halides (e.g. the chlorides and bromides) such as tetramethylammonium chloride, ureas and derivatives, such as N-p-chlorophenyl-N,N'-dimethylurea. The imidazoles are preferred.

The content of fillers can be from 10 to 80, preferably 50 to 80, percent by weight, based on the moulding composition.

The wollastonite used as filler is a naturally occurring and commercially available calcium metasilicate whose aqeuous extract (24 hours) shows basic reaction. The filler comprises preferably at least two-thirds, in particular at least three-quarters, of the total amount of filler and can also be used alone as filler.

Suitable fillers which can be employed in addition to wollastonite are e.g.: textile, glass, asbestos, boron and carbon fibres, powdered glass, glass beads, quartz flour, powdered quartz glass (crystalline amorphous quartz flour), mineral silicates such as mica, asbestos flour, powdered slate, kaolin, aluminium trihydroxide, powdered chalk, gypsum, antimony trioxide, bentonite, silica gel (aerosil), lithopone, barium sulfate, titanium dioxide, carbon black, graphite, oxide pigments, e.g. iron oxide, or metal powders, such as aluminum or iron powder. Conductive fillers should be avoided when using the moulding compositions in the electrical engineering industry.

A preferred moulding composition contains 50 to 70% by weight of wollastonite and up to 20% by weight of a further filler, in particular glass fibres or quartz flour.

In addition to the fillers, conventional modifiers can be added to the epoxy resin moulding compositions of the invention before curing in any phase. Examples of such modifiers are dyes, pigments, levelling agents, thixotropic agents, mould release agents, adhesion promoters for fillers and resin, flame retardants, such as halogen compounds with or without antimony trioxide, and also other synthetic resins, such as phenolics and aminoplasts, in particular up to 8% by weight of melamine-formaldehyde resin, in order to improve the adhesive strength of coated mouldings. Other possible synthetic resins are e.g. polyurethanes and silicones.

The epoxy resin moulding compositions can be obtained in conventional manner with the aid of known mixing devices (e.g. stirrers, kneaders, rolls and mills). Thus, for example, it is possible to mix the individual components with one another intensively, optionally after they have been ground beforehand (dry method). However, mixing can also be effected in a kneader to produce a granulate. Preferably the mouldings are obtained by the melt process (in a kneader or extruder) in the temperature range from 80° to 120° C.

The solid epoxy resin moulding compositions of the invention can be processed to mouldings of all kinds by conventional methods with curing. The curing temperature is normally between 140° and 200° C., preferably between 150° and 190° C. The moulding compositions are especially suitable for processing by transfer moulding. The moulding compositions are used for producing high grade mouldings, in particular in the electrical engineering industry. Metal components, for example, can be encased easily with these moulding compositions.

The epoxy resin moulding compositions of the present invention are free flowing, readily storable and surprisingly quick-curing moulding compositions which can be easily processed. Mouldings obtained therewith have good mechanical properties and an exceedingly good resistance to cracking as well as excellent resistance to continuous heat and excellent ejection hardness.

The following Examples illustrate the invention in more detail.

EXAMPLES 1 TO 7 AND COMPARISON EXAMPLES I TO V (A) Starting materials and manufacture of the moulding compositions Epoxy Resin A (according to U.S. Pat. No. 3,996,175)

A 2-liter reaction vessel is charged with 1000 g of a liquid bisphenol A epoxy resin having a content of 5.33 epoxy group equivalents/kg and a viscosity at 25° C. of 13.500 cP and heated in an oil bath to 140° C. Then 100 g of fused 4,4'-diaminodiphenylmethane (10.00 NH$_2$/kg) is mixed in at 100° C. in the course of 45 minutes. The rate of addition is such that the temperature of the reaction mixture does not exceed 150° C. After heating for a further 30 minutes at the same temperature, the resultant viscous liquid is cooled and the light yellow, resinous and brittle product is ground.

Properties of the product:
  epoxy group content/kg = 3.00
  melting point = 72° C.

Epoxy Resin B

Glycidylised cresol novolak containing 4.3 epoxide group equivalents/kg and with a melting point of 79° C. (measured on a Kofler bench).

Epoxy Resin C

Bisphenol A epoxy resin containing 1.1 equivalents/kg and with a melting point of 85° C. (measured on a Kofler bench).

Hardener A

Solid cresol novolak containing 8.5 hydroxyl group equivalents/kg and with a melting point of 90° C. (measured on a Kofler bench).

Hardener B 1,1,3-Triphenylolpropane containing 8.9 hydroxyl group equivalents/kg and with a melting point of 87° C. (measured on a Kofler bench).

Hardener C 1300 g of 4,4'-diaminodiphenylmethane are heated to 140° C. in a 3-liter reaction vessel. With constant stirring, 1000 g of liquid bisphenol A epoxy resin (containing 5.35 epoxy group equivalents/kg and having a viscosity at 25° C. of 13.500 cP) are added dropwise in the course of 50 minutes such that the temperature of the mixture does not exceed 170° C. The mixture is then kept for 30 minutes at 140° C. and the resultant product is subsequently cooled and ground.

Properties of the product:
  amino group equivalents/kg 4.45
  softening point: 57° C.
  melting point: 70° C.

Hardener D 476.8 g (2 moles) of 4,4'-diamino-3,3'-dimethyldicyclohexylmethane are heated to 130° C. in a 1-liter reaction vessel. Then 284.3 g (1 mole) of the diglycidyl ester of 1,2-cyclohexanedicarboxylic acid are added in the course of about 30 minutes and the mixture is kept for 30 minutes at 130° C. The resultant product is cooled and ground.

Properties of the product:
  amino group equivalents: 5.94
  softening point: 60° C.
  melting point: 73° C.

Hardener E 400 g of tetrachlorophthalyl anhydride and 600 g of quartz flour are ground and mixed for 13 hours in a ball mill.

Hardener F

Hardener F is 1,1,2,2-p-tetraphenylolethane containing 7.7 hydroxyl group equivalents and with a melting point of 112° C. (measured on a Kofler bench).

Accelerator 25 parts by weight of 2-ethylimidazole are dissolved in cresol novolak which has been fused at 140° C. After cooling, the mixture is ground. The melting point is 68° C. (measured on a Kofler bench).

Manufacture of the Moulding Compositions

The ingredients listed in Table 2 below are weighed in a total amount of 3 g into a cooled laboratory high-speed mixer and the mixture is homogenised for 2 minutes at a speed of 1400 c/min. This premix is fused and kneaded in a laboratory kneader at a cylinder temperature of 100° C. The resultant composition is cooled and ground to a granulate.

In comparison Examples I to III, the ingredients of Table 2 (total weight: 1.2 kg) are ground for 15 hours in a 5-liter ball mill.

(B) Technical Tests

Manufacture of the Samples

The samples are obtained by moulding in hot moulds of 170° C. The moulding composition is first processed to tablets and these tablets are preheated to about 80° C. by high-frequency. The curing time is 8 minutes.

Resistance to Continuous Heat

Cured samples (4×10×60) are subjected to a post-curing for 15 hours at 160° C. and then stored at 160°, 180°, 200° and 225° C. while registering the change in the weight loss. The temperatures at which the weight loss is 5% by weight after 5000 hours is determined from the results obtained, and these values are used as a measure of the resistance to continuous heat.

Ejection Hardness

Samples (10×15×120) which are obtained by transfer moulding in a hot mould of 170° C. are used to determine the ejection hardness. The hot samples are taken out of the mould within 5 seconds of opening it, then placed on two supports spaced 100 mm apart, and subjected to a load of 5 kg in the centre. The deflection of the rod is read off after 60 seconds using an indicator. The values obtained are used as a measure of the hardness at the moment of removal from the mould.

Resistance to Cracking

Two small steel plates measuring 4×30×60 mm, which have been degreased with methylene chloride, are initially preheated in the mould which has a temperature of 170° C. Then one side is coated with a 1.5 mm layer and the other with a 2.5 mm layer of moulding composition by the transfer moulding method. The moulding composition is used in the form of tablets weighing 60 to 70 g. The moulding is so coated that, on adjacent sides, two corners of the metal plate separated by epoxy resin are not encased. The moulding time is 3 minutes, after which the mouldings are cooled to room temperature.

The classification of the resistance to cracking follows from the cooling tests, which are summarised in Table 1.

TABLE 1

| | |
|---|---|
| cracks within 1 hour after removal from mould | 5 |
| cracks within 4 hours | 4 |
| cracks within 24 hours | 3 |
| cracks on cooling from room temperature to 0° C. in ice water (½ hour) | 2 A |
| cracks after ½ hour on heating at 100° C. and cooling to 0° C. in ice water (½ hour) | 2 B |
| cracks after cooling from room temperature to −20° C. (½ hour in alcohol/dry ice) | 1 A |
| cracks after cooling from room temperature to −40° C. (½ hour in alcohol/dry ice) | 1 B |
| no cracks after all shock stages | 0 |

The test results are reported in Table 2.

TABLE 2

| Composition (% by weight) and test results | Example | | | | | | | | | | | |
|---|---|---|---|---|---|---|---|---|---|---|---|---|
| | 1 | 2 | 3 | 4 | 5 | 6 | 7 | I | II | III | IV | V |
| epoxy resin A | 18.2 | 18.2 | 18.2 | 18.2 | 18.8 | 14.0 | 10.0 | 19.0 | 19.0 | 19.5 | — | 11.7 |
| epoxy resin B | — | — | — | — | — | 4.0 | 2.8 | — | — | — | 16.0 | — |
| epoxy resin C | — | — | — | — | — | — | 6.0 | — | — | — | — | — |
| hardener A | 6.5 | 6.5 | 6.5 | 6.5 | — | 7.0 | — | — | — | — | 8.5 | — |
| hardener B | — | — | — | — | 5.9 | — | — | — | — | — | — | — |
| hardener C | — | — | — | — | — | — | — | 6.0 | 6.0 | — | — | — |
| hardener D | — | — | — | — | — | — | — | — | — | 5.5 | — | — |
| hardener E | — | — | — | — | — | — | — | — | — | — | — | 13.0 |
| hardener F | — | — | — | — | — | — | 5.8 | — | — | — | — | — |
| catalyst | 0.3 | 0.3 | 0.3 | 0.3 | 0.3 | 0.3 | 0.4 | — | — | — | 0.5 | 0.3 |
| quartz flour | 73.4 | — | 62.4 | — | — | — | — | 62.4 | — | — | — | — |
| natural wollastonite | — | 73.4 | — | 62.4 | 62.4 | 58.1 | 60.2 | — | 62.4 | 62.4 | 62.4 | 58.1 |
| glass fibers | — | — | 11 | 11 | 11 | 11 | 13.0 | 11 | 11 | 11 | 11 | 11 |
| melamine-formaldehyde-resin[1] | — | — | — | — | — | 4 | — | — | — | — | — | — |
| wax[2] | 1.1 | 1.1 | 1.1 | 1.1 | 1.1 | 1.1 | 1.3 | 1.1 | 1.1 | 1.1 | 1.1 | 1.1 |
| gas black | 0.5 | 0.5 | 0.5 | 0.5 | 0.5 | 0.5 | 0.5 | 0.5 | 0.5 | 0.5 | 0.5 | 0.5 |
| resistance to cracking | 2 B | 0 | 0 | 0 | 0 | 0 | 0 | 5 | 5 | 4 | 5 | — |
| resistance to continuous heat | 180 | 180 | — | — | — | — | 180 | 170 | 170 | 160 | 180 | — |
| ejection hardness | 2.2 | 2.5 | 2.1 | 2.3 | 2.2 | 1.9 | 2.6 | 3.0 | 3.2 | 4.2 | 1.9 | — |

[1]Melopas P
[2]OP wax (Hoechst)

It is apparent from Table 2 that, in comparison to Examples I and II (cf. U.S. Pat. No. 3,966,175) and III (cf. U.S. Pat. No. 3,963,666), IV (higher molecular bisphenol A epoxy resin) and V (anhydride curing), the moulding compositions of the invention all have an excellent resistance to cracking. The resistance to continuous heat and ejection hardness are the same or better.

It was not possible to process the moulding composition of comparison Example V, as it sticks in the mould and the mouldings cannot be removed.

What is claimed is:

1. An epoxy resin moulding composition consisting of (a) a solid epoxy resin which is an adduct of a low molecular diglycidyl ether of bisphenols and an aromatic diamine and which has a melting point of at least 50° C. and contains at least 2.0 epoxy equivalents per kg of resin, (b) a hardener, (c) at least one accelerator, and (d)

at least one filler, said epoxy resin composition containing, as hardener (b), at least one aromatic polyol containing more than 5 phenolic hydroxyl equivalents per kg of polyol and having a melting point of at least 50° C., and in an amount such that the content of phenolic hydroxyl groups per epoxy group is 0.5 to 1.5.

2. A moulding composition according to claim 1, wherein the aromatic polyol is a novolak.

3. A moulding composition according to claim 2, wherein the novolak is a phenol, resorcinol, cresol or xylenol novolak or a mixture of these phenols.

4. A moulding composition according to claim 1, wherein the aromatic polyol is a hydroxyphenylated hydrocarbon which preferably contains 2 to 10, carbon atoms.

5. A moulding composition according to claim 4, wherein the aromatic polyol is 1,1,2,2-tetrahydroxyphenylethane, 1,1,3-trihydroxyphenylpropane or poly-p-vinylphenol.

6. A moulding composition according to claim 1 which contains the fillers in an amount of 10 to 80% by weight, preferably 30 to 80% by weight and, most preferably, 50 to 80% by weight, based on said moulding composition.

7. A moulding composition according to claim 1, wherein at least two-thirds of the total amount of filler consists of wollastonite and the remainder consists of glass fibres.

8. A moulding composition according to claim 1 which contains the accelerator (c) in an amount of 0.1 to 5% by weight, based on the moulding composition.

9. A moulding composition according to claim 1, wherein the epoxy resin is an adduct of a low molecular bisphenol A-diglycidyl ether and 4,4'-diaminodiphenylmethane.

10. A moulding composition according to claim 1 which additionally contains up to 8% of a malamine formaldehyde resin, based on the moulding composition.

11. Mouldings made from a cured moulding composition according to claim 1.

12. A process for the manufacture of mouldings according to claim 11, which comprises curing an epoxy moulding composition consisting of (a) a solid epoxy resin with a melting point of at least 50° C. which is an adduct of a low molecular diglycidyl ether of bisphenols and an aromatic diamine and which contains at least 2.0 epoxy equivalents per kg of resin, (b) a hardener consisting of at least one aromatic polyol containing more than 5 phenolic hydroxyl group equivalents per kg of polyol and having a melting point of at least 50° C., in an amount such that the content of phenolic hydroxyl groups per epoxy group is 0.5 to 1.5, (c) at least one accelerator and (d) at least one filler.

13. The composition of claim 8 wherein the accelerator is an imidazole.

* * * * *